US007000393B1

(12) United States Patent
Wood et al.

(10) Patent No.: US 7,000,393 B1
(45) Date of Patent: Feb. 21, 2006

(54) SYSTEM AND METHOD FOR RELIEVING ENGINE BACK-PRESSURE BY SELECTIVELY BYPASSING A STAGE OF A TWO-STAGE TURBOCHARGER DURING NON-USE OF EGR

(75) Inventors: Terry G. Wood, Countryside, IL (US); Grzegorz Siuchta, Glendale Heights, IL (US); Wesley J. Terry, Union, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/106,994

(22) Filed: Apr. 14, 2005

(51) Int. Cl.
*F02B 47/08* (2006.01)
*F02M 25/07* (2006.01)

(52) U.S. Cl. .................. 60/605.2; 60/602; 60/612; 123/562; 701/100

(58) Field of Classification Search ............ 60/602, 60/605.2, 612; 123/562; 701/100, 108
See application file for complete search history.

(56) References Cited

U.S. PATENT DOCUMENTS

| | | | |
|---|---|---|---|
| 4,087,966 A | | 5/1978 | Akado et al. |
| 4,215,550 A | | 8/1980 | Dinger et al. |
| 4,930,315 A | | 6/1990 | Kanesaka |
| 5,199,261 A | | 4/1993 | Baker |
| 5,671,600 A | | 9/1997 | Pischinger et al. |
| 5,738,126 A | * | 4/1998 | Fausten ................. 123/568.21 |
| 5,771,867 A | | 6/1998 | Amstutz et al. |
| 6,000,222 A | | 12/1999 | Regnier |
| 6,062,026 A | | 5/2000 | Woollenweber et al. |
| 6,263,672 B1 | | 7/2001 | Roby et al. |
| 6,422,217 B1 | | 7/2002 | Feucht et al. |
| 6,457,461 B1 | * | 10/2002 | Romzek .................... 60/605.2 |
| 6,467,270 B1 | * | 10/2002 | Mulloy et al. ............. 60/605.2 |
| 6,497,227 B1 | * | 12/2002 | Wang et al. ................. 60/602 |
| 6,687,601 B1 | * | 2/2004 | Bale et al. ................... 60/602 |
| 6,722,129 B1 | * | 4/2004 | Criddle et al. ............ 60/605.2 |
| 6,732,522 B1 | * | 5/2004 | Wright et al. ................ 60/602 |
| 6,804,601 B1 | * | 10/2004 | Wang et al. .................. 60/602 |
| 6,837,227 B1 | * | 1/2005 | Jaliwala et al. ........ 123/568.21 |
| 6,850,833 B1 | * | 2/2005 | Wang et al. ............... 60/605.2 |
| 2005/0045407 A1 | | 3/2005 | Bullcz et al. |

OTHER PUBLICATIONS

Ford Motor Company, "7.3 DIT Power Stroke: Direct Injection Turbocharged Diesal Engine, 'F' Series Super Duty," FSC 12922JA,1999.

* cited by examiner

*Primary Examiner*—Sheldon J Richter
(74) *Attorney, Agent, or Firm*—Dennis Kelly Sullivan; Susan L. Lukasik; Jeffrey P. Calfa

(57) ABSTRACT

A valve (50) selectively shunts exhaust gas around a stage (20T) of a turbocharger turbine (20) under control of a control system that selectively renders an EGR system (38) active and inactive and that develops a value for a set-point of operation for the valve. The control system comprises a first map set (60, 142) containing data that the control system uses to the exclusion of data in a second map set (80, 148) to develop the set-point value when the EGR system is active. When the EGR system is inactive, the control system uses the data in the second map set to the exclusion of the data in the first map set to develop the set-point value.

15 Claims, 3 Drawing Sheets

SYSTEM AND METHOD FOR RELIEVING ENGINE BACK-PRESSURE BY SELECTIVELY BYPASSING A STAGE OF A TWO-STAGE TURBOCHARGER DURING NON-USE OF EGR

FIELD OF THE INVENTION

This invention relates to internal combustion engines, such as diesel engines, that have turbochargers, such as two-stage turbochargers.

BACKGROUND OF THE INVENTION

A known turbocharger system for an engine comprises a two-stage turbocharger that comprises high- and low-pressure turbines in series flow relationship and a bypass valve that is in parallel flow relationship to the high-pressure turbine and under the control of the engine control system. The engine control system processes various data to control the bypass valve such that exhaust back-pressure and engine boost are regulated in an appropriate way according to the manner in which the engine is being operated. The high-pressure stage can be designed to have a relatively smaller size that is optimized for low-end engine performance while the low-pressure stage can be designed with a relatively larger size for high-end performance.

Exhaust gas recirculation (EGR) is typically used over a wide range of engine operating conditions under various ambient conditions to aid in controlling tailpipe emissions for achieving compliance with applicable laws and regulations. Engine engineers may however deem it appropriate, without violating applicable laws and/or regulations, to temporarily suspend the use of EGR during certain conditions that affect engine operation in certain ways. Reasons for such temporary non-use of EGR may include the following: EGR is simply unnecessary; EGR has no significant effect; or EGR is actually detrimental. Another possible reason is that sufficiently precise control of EGR cannot be realized while such conditions prevail.

A turbocharger control strategy may take into account many engine operating parameters, including EGR, over a wide range of engine operation. When an engine operates while prevailing conditions require EGR to be inactive, a turbocharger control strategy may require adaptation for inactive EGR.

Failure to adapt the strategy for inactive EGR can cause the engine to operate in ways that are detrimental to engine performance and/or durability. One consequence is an undesired increase in exhaust back-pressure (EBP) caused by a turbocharger control strategy striving to increase boost when it is inappropriate to do so because certain prevailing conditions, such as an engine being cold or being extremely hot to the point of overheating stipulate that EGR be rendered inactive during those conditions.

SUMMARY OF THE INVENTION

The present invention in one respect relates to a system and method for adapting a turbocharger control strategy to avoid such undesired increases in engine EBP.

The disclosed preferred embodiment of the invention employs multiple map sets containing data values for turbocharger set-point. One map set is used to the exclusion of another depending on whether the engine control system is rendering the EGR system active or inactive. When engine temperature is cold or too hot, the EGR system is rendered inactive and one map set is used to the exclusion of another to control turbocharger set-point and consequently both EBP at an engine exhaust manifold and manifold absolute pressure (MAP) at an engine intake manifold. When engine temperature is neither cold nor too hot, the EGR system is rendered active and the other map set is used to the exclusion of the one map set.

The set-point map may contain data values based on EBP, MAP, or MGP (manifold gauge pressure). The system preferably uses a closed-loop control strategy using a data value for a set-point from a selected map as a command input and a data value from a suitable data source as a feedback input that is subtracted from the command input to provide an error signal that the strategy continually seeks to null out for causing the turbocharger to operate as closely as possible to the set-point. The particular source of feedback is appropriate to the particular parameter represented by data values in the maps, i.e. EBP, MAP, or MGP.

Accordingly, one generic aspect of the present invention relates to an internal combustion engine that has an intake system including a turbocharger compressor for developing combustion charge air for the engine, combustion chambers where charge air and fuel are combusted to operate the engine, and an exhaust system through which exhaust gas resulting from combustion pass from the combustion chambers. The exhaust system also includes a turbocharger turbine that uses exhaust gas to operate the turbocharger compressor.

An EGR system recirculates some exhaust gas from the exhaust system to the intake system when active, but at times may be rendered inactive by the control system, particularly when the engine is either cold or too hot.

A bypass valve shunts a stage of the turbine and when open, shunts exhaust gas around the stage.

The control system renders the EGR system selectively active and inactive. It also develops a value for a set-point of operation for the valve defining the extent to which the valve shunts exhaust gas around the turbine stage, thereby setting a set-point for turbocharger operation.

The control system comprises a first map set containing data that the control system uses to the exclusion of data in a second map set in developing the set-point value when the EGR system is active. The control system uses the data in the second map set to the exclusion of the data in the first map set when the EGR system is inactive.

Still other generic aspects relate to the control system and to a method for turbocharger set-point control.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
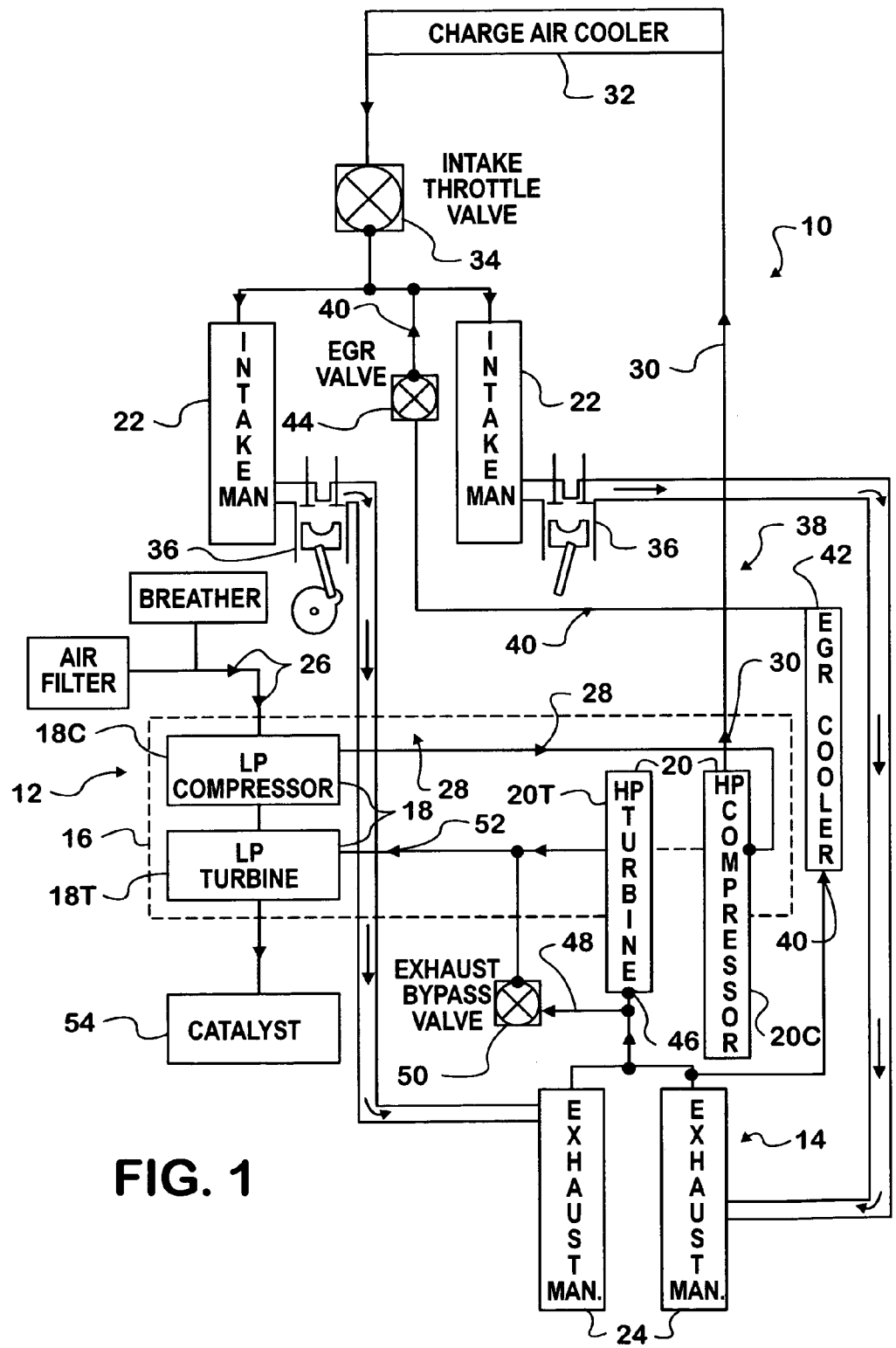
FIG. 1 is a general schematic diagram of an exemplary internal combustion engine having an engine control system in accordance with principles of the present invention.

FIG. 1 shows an exemplary internal combustion engine 10 having an intake system 12 through which air for combustion enters the engine and an exhaust system 14 through which exhaust gas resulting from combustion exits the engine. Engine 10 is, by way of example, a turbocharged diesel engine comprising a two-stage turbocharger 16 that has a low-pressure stage 18 and a high-pressure stage 20. By way of example, engine 10 is a multi-cylinder V-type engine having intake manifolds 22 and exhaust manifolds 24, and when used in a motor vehicle, such as a truck, is coupled through a drivetrain (not shown) to propel the vehicle.

Air drawn into intake system 12 follows an entrance path indicated by arrows 26 leading to a compressor 18C of low-pressure stage 18. A compressor 20C of high-pressure stage 20 is in downstream series flow relationship to compressor 18C via a path marked by arrows 28. A path marked by arrows 30 continues from compressor 20C through a charge air cooler 32 and an intake throttle valve 34 to intake manifolds 22.

From intake manifolds 22, charge air enters engine cylinders 36 into which fuel is injected to form a mixture that is combusted to power the engine. Gas resulting from combustion is exhausted through exhaust system 14, but some portion may be recirculated through an exhaust gas recirculation (EGR) system 38. Recirculated exhaust gas from exhaust manifolds 24 follows a path marked by arrows 40 through an EGR cooler 42 and an EGR valve 44 back to intake manifolds 22.

Upon leaving exhaust manifolds 24, exhaust gas that is not recirculated is constrained to take one or both of two parallel paths marked by respective arrows 46, 48. Path 46 comprises a turbine 20T of high-pressure stage 20, and path 48, a bypass valve 50. After turbine 20T and valve 50, the paths 46, 48 merge into a common path 52 leading to a turbine 18T of low-pressure stage 18. Beyond turbine 18T, exhaust gas may pass through one or more exhaust gas treatment devices, such as a catalyst 54, before being exhausted to atmosphere.

Exhaust bypass valve 50 is under the control of the engine control system. The engine control system processes various data to control valve 50 such that exhaust back-pressure and engine boost are regulated in an appropriate manner according to the manner in which the engine is being operated. An advantage of having two turbines 20T, 18T in series flow relationship, with valve 50 providing for control of the amount of exhaust gas allowed to bypass turbine 20T, is that high-pressure stage 20 can be designed to be smaller in size and optimized for low-end engine performance, while low-pressure stage 18 can be designed to be larger in size for better high-end performance.

By closing exhaust bypass valve 50 during low-end engine operation the entire exhaust gas flow passes through both turbines 20T, 18T, and high-pressure compressor 20C will develop higher outlet pressure that so that the charge air is developed by both compressor stages. This can provide desirable increased low-end boost.

Over a mid-speed range and high end of engine operation, valve 50 may be operated to partially open or fully open condition as appropriate to achieve desired boost and back-pressure.

The inventive turbocharger bypass control (TCBC) strategy is embodied in the engine control system which comprises one or more processors containing algorithms for processing data. Through control of valve 50, the strategy may be considered to control the set-point for turbocharger operation.

Figure 2:
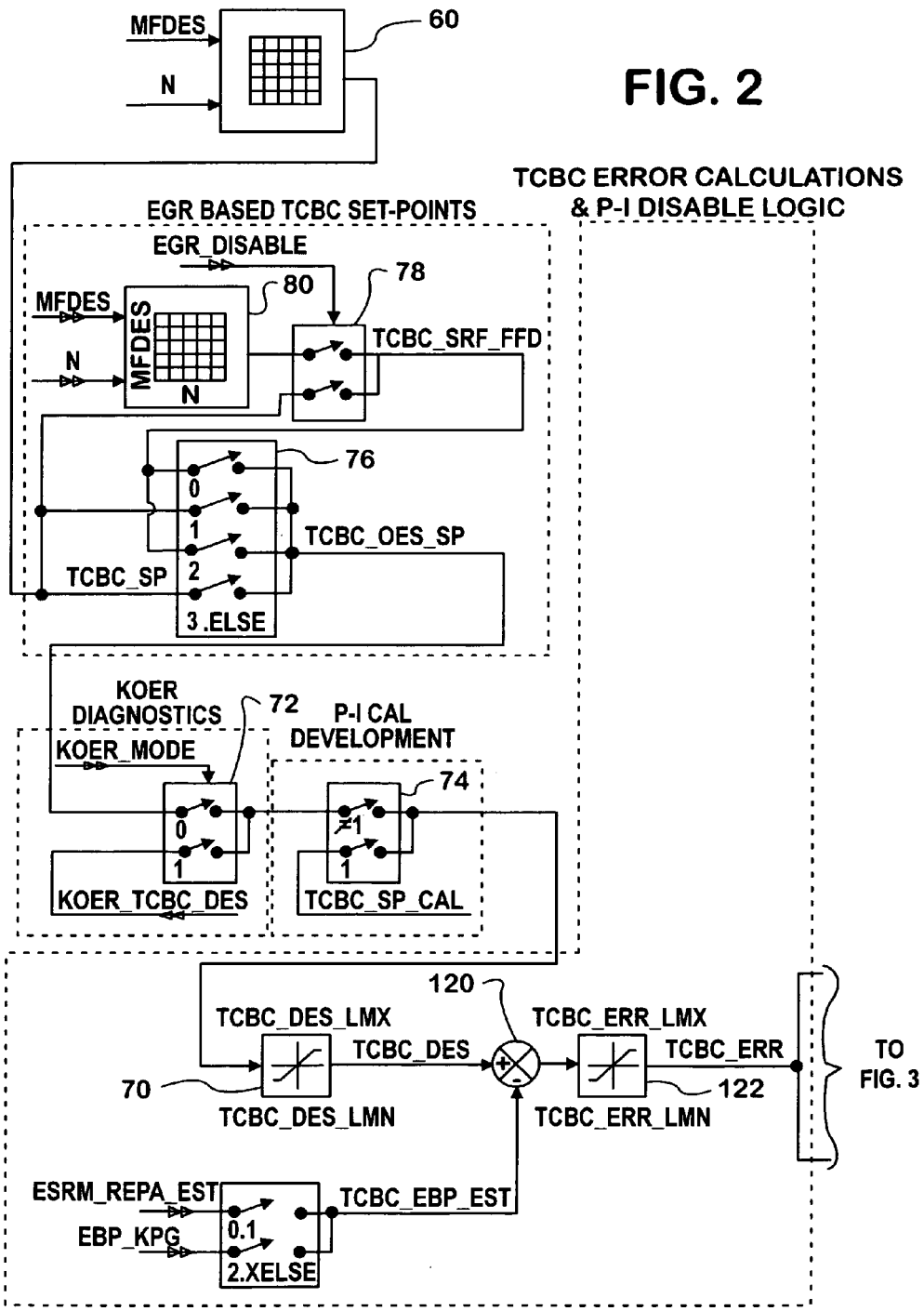
FIG. 2 is first portion of a software strategy diagram representing algorithms programmed in the engine control system in accordance with principles of the present invention.

A data value for desired turbocharger bypass control of valve 50 in a particular engine is a parameter TCBC_DES shown in FIG. 2. The data value is developed by the engine control system to set the extent to which valve 50 is open. The data value for TCBC_DES is a function primarily of engine speed and engine load. Data values for TCBC_DES are contained in a generic map 60 shown in FIG. 2 where speed data represented by the parameter N and engine load represented by engine fueling data MFDES are inputs to map 60.

A data value for TCBC_DES is selected from map 60 based on the input data values for speed and load. Compensation and filtering for certain transient conditions and certain parameters such as barometric pressure and engine temperature may be present in some systems, and limiting of various data may be performed as appropriate. Map 60 may actually comprise a single map or multiple individual maps each providing a corresponding range of set-point data values correlated appropriately with speed and load data values. The stored data values may represent any of the parameters EPB, MAP, or MGP.

The basic strategy for controlling valve 50 is premised on repeatedly calculating a set-point that defines the extent to which the valve should be open by repeatedly processing data for the appropriate parameters such as engine speed and engine fueling. The set-point changes as values of relevant parameters change. The basic strategy may also take in account the occurrences of certain transients by including their effects in the set-point calculation. The strategy then uses the calculated set-point as a control input to a control portion of the strategy that strives to operate valve 50 so that the amount of valve opening corresponds as closely as possible to the set-point in real time. Such processing may use a combination of feed-forward and feedback control, with the latter using proportional and integral (PI) control, or it may use only feedback control.

Certain operating conditions may affect engine operation in ways that make it appropriate to temporarily discontinue use of EGR while those conditions continue. It has been observed that when EGR is shut off, i.e. rendered inactive, because an engine is either cold or very hot, the turbocharger increases boost and hence mass airflow into the engine, and as a result can create unacceptable increase in engine EBP due in significant part to the increased mass flow.

The present invention is directed to a solution for avoiding such EBP increases. As will be explained herein, the solution is embodied by providing several additional maps that, when the strategy renders EGR temporarily inactive, are used in substitution of other maps that are used when EGR is active. In this way the basic control strategy is maintained, but is adapted in an especially convenient way to avoid unacceptable EBP increases resulting from conditions like those just described.

The data value for TCBC_DES results from evaluation of a data value for a parameter TCBC_DES_SP (also in FIG. 2) performed by an evaluation function 70 for compliance with minimum and maximum limits represented by respective parameters TCBC_DES_LMN and TCBC_DES_LMX. If the data value for TCBC_DES_SP is within the limits, it is passed by function 70. If it is above the maximum, the value passed is the value of TCBC_DES_LMX. If it is below the minimum, the value passed is the value of TCBC_DES_LMN. The switch functions 72, 74 shown inside the broken line rectangles designated KOER Diagnostics and P-I Cal Development are provided for diagnostic and development purposes. When the turbocharged engine is operating in a production motor vehicle, like a truck, those switch functions pass the data value of TCBC_DES_SP to function 70 for evaluation.

The data value for TCBC_DES_SP may be either the data value for a parameter TCBC_SP or the data value for a parameter TCBC_SPF, as selected by the coaction of a switch function 76 and a switch function 78 based on various modes numbered "1" through "5". Mode "0" represents the normal operating mode in a production motor vehicle. Other modes are used for diagnostic or development purposes.

In mode "0", the data value for TCBC_DES_SP is the data value for TCBC_SPF. Depending on the state of switch function 78, the data value for TCBC_SPF may be either the data value for TCBC_SP or a data value from a map 80. In accordance with certain principles of the present invention, switch function 78 is controlled by a parameter EGR_DISABLE. When use of EGR is discontinued, EGR_DISABLE causes switch function 78 to provide a data value from map 80 as the data value for TCBC_SPF. When use of EGR is resumed, EGR_DISABLE causes switch function 78 to provide the data value for TCBC_SP as the data value for TCBC_SPF.

As will be more apparent from further description, it is this selective use of: A) a data value from map 80 that changes the set-point in a way that avoids undesired increase in EBP when the engine control system renders EGR inactive because the engine is either cold or too hot, and B) the data value for TCBC_SP when the engine control system renders EGR active, that are significant to principles of the present invention.

The data value for a parameter MFDES corresponds to the rate at which the engine is being fueled, and may be derived from any suitably appropriate source. The data value for a parameter N corresponds to engine speed, and may be derived from any suitably appropriate source. MFDES and N are inputs to the generic map 60, which as noted earlier may comprise multiple individual maps.

Map 60, whether a single map or multiple maps, contains a number of data values, each of which correlates with a respective pair of data values, one for engine fueling MFDES and one for engine speed N. Each data value for engine fueling MFDES represents a corresponding fractional span of a range of engine fueling while each data value for engine speed represents a corresponding fractional span of a range of engine speeds. For any given combination of engine fueling and engine speed, engine fueling will fall within one of its fractional spans in the map, and engine speed will fall within one of its fractional spans, causing the particular data value stored in the map in correlation with the two respective fractional spans to be supplied for further processing by function 70, and it is that basic set-point value that is further processed through the strategy when EGR is active. As will be explained later, it is the data value from a different map 80 that is processed further through the strategy when EGR is not active.

The data value passed through evaluation function 70 forms an input for closed-loop control of valve 50. A summing function 120 (see FIG. 2) is where the loop is closed. In mode "0", function 120 subtracts a data value TCBC_EBP_EST from the data value for TCBC_DES. The data value for TCBC_EBP_EST may be obtained in any suitably appropriate way, such as by estimation, or by actual measurement using a device like a sensor at an appropriate location in the engine system. The difference is a data value representing the error between the two.

When the data stored in map 60 represents EBP, the data value for TCBC_EBP_EST represents actual or estimated EBP. When the data stored in map 60 represents MAP, the data value for TCBC_EBP_EST represents actual or estimated MAP. When the data stored in map 60 represents MGP, the data value for TCBC_EBP_EST represents actual or estimated MGP.

The error difference is next evaluated by an evaluation function 122 against minimum and maximum preset limits, as shown by FIG. 2. If the data value for the error difference is more positive than the data value for the maximum preset limit (parameter TCBC_ERR_LMX), then the data value for TCBC_ERR_LMX is passed. If the data value for the error difference is more negative than the data value for the minimum preset limit (parameter TCBC_ERR_LMN), then the data value for TCBC_ERR_LMN is passed. If the data value for the error difference is between the limits, the data value for the actual error difference itself is passed.

Figure 3:
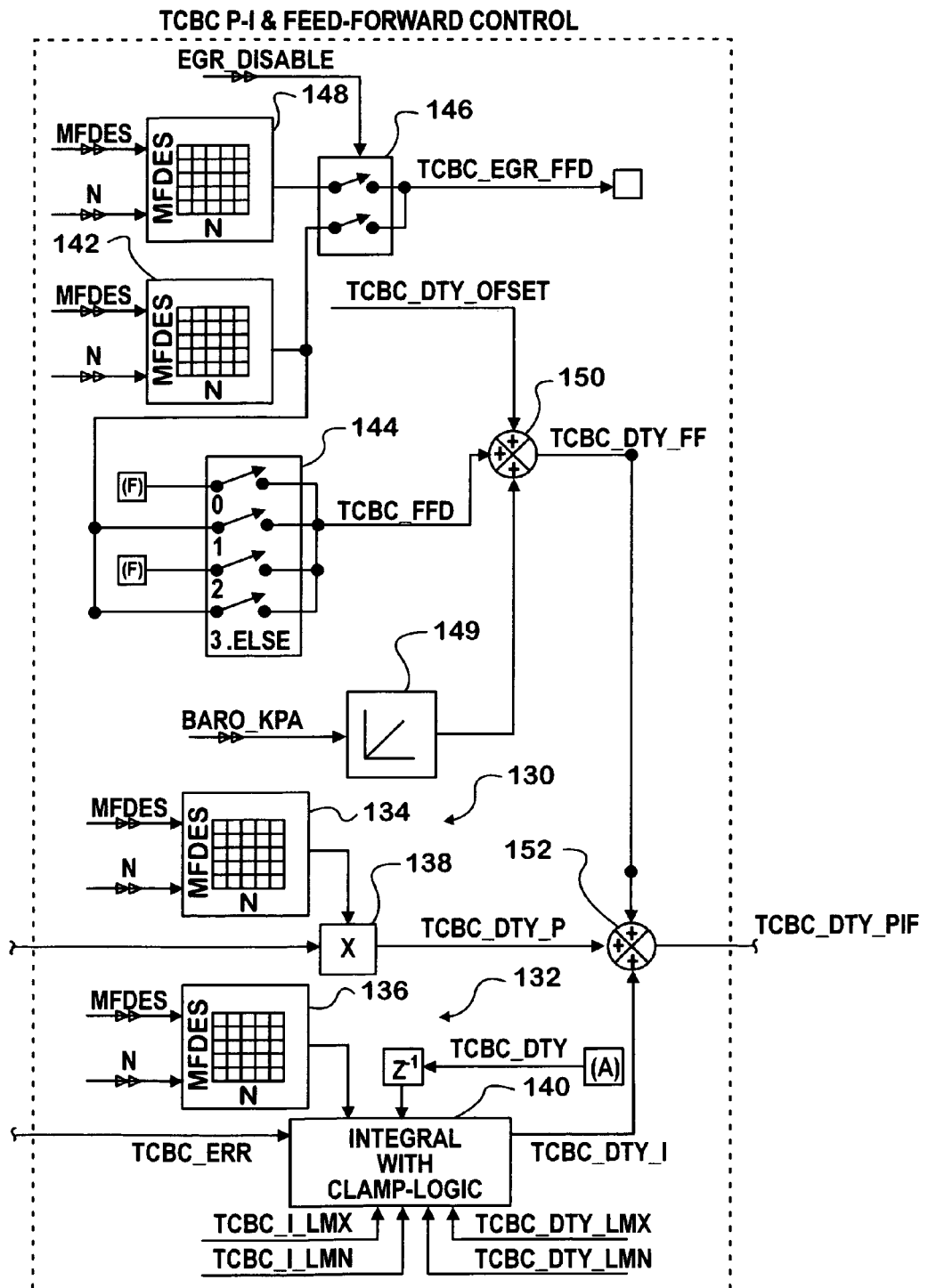
FIG. 3 is a second portion of the software strategy diagram.

The error data value that is passed is designated by a parameter TCBC_ERR, which is then processed by TCBC P-I & Feed-Forward Control that is shown in FIG. 3 to comprise both a proportional function 130 and an integral function 132 that process TCBC_ERR. A respective gain is associated with each function 130, 132, the gain KP being associated with proportional function 130 and the gain KI being associated with integral function 132. Each gain is itself a function of engine fueling and engine speed.

FIG. 3 further shows TCBC P-I & Feed-Forward Control to comprise a map 134 for setting the gain for proportional function 130 and a map 136 for setting the gain for integral function 134.

Map 134 contains a number of data values of proportional gain KP, each of which correlates with a respective pair of data values, one for engine fueling MFDES and one for engine speed N. Each data value for engine fueling MFDES represents a corresponding fractional span of a range of engine fueling while each data value for engine speed represents a corresponding fractional span of a range of engine speeds. For any given combination of engine fueling and engine speed, engine fueling will fall within one of its fractional spans in map 134, and engine speed within one of its fractional spans, causing the particular data value for proportional gain KP corresponding to the two respective fractional spans to be supplied to a multiplication function 138.

Map 136 contains a number of data values of integral gain KI, each of which correlates with a respective pair of data values, one for engine fueling MFDES and one for engine speed N. Each data value for engine fueling MFDES represents a corresponding fractional span of a range of engine fueling while each data value for engine speed represents a corresponding fractional span of a range of engine speeds. For any given combination of engine fueling and engine speed, engine fueling will fall within one of its fractional spans in map 136, and engine speed within one of its fractional spans, causing the particular data value for integral gain corresponding to the two respective fractional spans to be supplied to an integrator 140 of integral function 132. Integrator 140 includes clamp-logic for constraining the integration rate to maximum and minimum limits.

The data value for a parameter TCBC_FFD represents an approximate target value a feed-forward component for the TCBC set-point. The data value for TCBC_FFD may be either the data value for a parameter TCBC_EGR_FFD or a data value selected from a map 142, as selected by the coaction of a switch function 144 and a switch function 146 based on the various modes "0" through "5".

In mode "0", the states of switch functions 144, 146 cause the data value for TCBC_FFD to be determined by the state of switch function 146 that is under the control of EGR_DISABLE. When use of EGR is discontinued, EGR_DISABLE causes switch function 146 to provide a data value from a map 148 as the data value for TCBC_EGR_FFD. When use of EGR is resumed, EGR_DISABLE causes switch function 146 to provide the data value for TCBC_EGR_FFD as a data value selected from map 142.

Map 142 that contains a number of data values representing set-point target values that are to be used when EGR is active. Each set-point target data value correlates with a respective pair of data values, one for engine speed N and one for engine fueling MFDES. Each data value for engine speed represents a corresponding fractional span of the total engine speed range while each data value for fueling represents a corresponding fractional span of the total range of engine fueling. For any given combination of engine speed and engine fueling, engine speed will fall within one of the fractional speed spans in the map, and engine fueling within one of the fractional fueling spans, causing the particular set-point target value corresponding to the two respective fractional spans to be selected for further processing when EGR is not disabled.

Map 148 that contains a number of data values representing set-point target values that are to be used when EGR is inactive, i.e. disabled. Each set-point target data value correlates with a respective pair of data values, one for engine speed N and one for engine fueling MFDES. Each data value for engine speed represents a corresponding fractional span of the total engine speed range while each data value for fueling represents a corresponding fractional span of the total range of engine fueling. For any given combination of engine speed and engine fueling, engine speed will fall within one of the fractional speed spans in the map, and engine fueling within one of the fractional fueling spans, causing the particular set-point target value corresponding to the two respective fractional spans to be selected for further processing when EGR is disabled.

One aspect of the present invention relates to this selective use of: A) a data value from map 148 that changes the set-point in a way that avoids undesired increase in EBP when the engine control system temporarily discontinues, i.e. disables, EGR because the engine is either cold or becomes too hot, and B) a data value from map 142 when EGR is active, i.e. not disabled.

It should be noticed that the feed-forward target set-point selection using speed and engine fueling is an open-loop function, whereas the proportional and integral control provided by functions 130, 132 are closed-loop functions. The strategy therefore relies on an open-loop, feed-forward function to approximate the desired TCBC set-point and a closed-loop function acting in concert with the open-loop function to actually attain the desired set-point.

Rather than relying on speed and desired fueling exclusively for the open-loop approximation of TCBC set-point, the disclosed strategy also includes barometric pressure BARO_KPA and an offset as additional factors. A function generator 149 and an offset (parameter TCBC_DTY_OFSET) provide two additional data values that are summed by a summing function 150 with the data value obtained from either map 142 or map 148, depending on whether EGR is active, to create a data value for a parameter TCBC_DTY_FF representing a target data value that at least approximates desired TCBC.

The data value for TCBC_DTY_FF, the data value for TCBC_DTY_P provided by proportional function 130, and the data value for TCBC_DTY_I provided by integral function 132 are algebraically summed by a summing function 152. The data value resulting from the summation is the data value for a parameter TCBC_DTY_PIF that controls a conventional actuator (not shown) for valve 50.

In summary then, the disclosed strategy has been shown to develop desired TCBC as an input to a control system for forcing actual TCBC to correspond as closely as possible to that input. Various forms of compensation can be applied to the desired TCBC input ahead of the point where the feedback loop is closed. Generic principles of the invention are broad enough to encompass any, all, or none of those various forms of compensation. The strategy may be executed at any appropriate execution rate, such as 125 hz for example.

The combination of proportional control and integral control, i.e. P-I control, is considered a preferred form of feedback control that is most appropriate for control of TCBC. The combination of feed-forward, open-loop control with P-I closed-loop control may also be desirable in certain applications. Principles of the invention relating to the selective disabling of EGR may however be practiced with specific control strategies other than the disclosed feed-forward, open-loop control and P-I closed-loop control. In certain control strategies the use of feed-forward control may be unnecessary, in which case, only feedback control is employed. FIG. 3 has however illustrated the selective use of maps 142, 148 as an aspect of the invention that by itself is within the generic principles of the invention, and in conjunction with the selective use of map 80 is a further enhancement to generic principles represented by the selective use of map 80.

While a presently preferred embodiment of the invention has been illustrated and described, it should be appreciated that principles of the invention apply to all embodiments falling within the scope of the following claims.

What is claimed is:

1. A control system for an internal combustion engine that has an intake system including a turbocharger compressor for developing combustion charge air for the engine, combustion chambers where charge air and fuel are combusted to operate the engine, an exhaust system through which exhaust gas resulting from combustion pass from the combustion chambers, including a turbocharger turbine that uses exhaust gas to operate the turbocharger compressor, an EGR system for recirculating some exhaust gas from the exhaust system to the intake system, and a valve for selectively shunting exhaust gas around a stage of the turbine, the control system comprising:

a processor for processing data to selectively render the EGR system active and inactive and to develop a value for a set-point of operation for the valve defining the extent to which the valve shunts exhaust gas around the turbine stage, a first map set containing set-point data based on the EGR system being active and a second map set containing set-point data based on the EGR system being inactive, wherein the processor processes data selected from the first map set and not from the second map set to develop the set-point value when the EGR system is active, and processes data selected from the second map set and not from the first map set to develop the set-point value when the EGR system is inactive.

2. A control system as set forth in claim 1 wherein the data in both maps sets are measured by a parameter comprising one of exhaust back-pressure, manifold absolute pressure, and manifold gauge pressure, and the control system comprises a closed-loop control that closes a control loop by feedback measured in the same parameter as the parameter in which the map data is measured.

3. A control system as set forth in claim 1 wherein the first map set comprises a first map containing data values each correlated both with a particular span of engine fueling within a range of engine fueling and with a particular span of engine speed within a range of engine speeds, the second map set comprises a second map containing data values each correlated both with a particular span of engine fueling within a range of engine fueling and with a particular span of engine speed within a range of engine speeds, and when the EGR system is active, the processor selects for further processing to develop the set-point value a data value from the first map based on current engine speed and current engine fueling, and when the EGR system is inactive, the processor selects for further processing to develop the set-point value a data value from the second map based on current engine speed and current engine fueling.

4. A control system as set forth in claim 3 wherein the processor processes data to develop a closed-loop control component for control of the valve, and when the EGR system is active, processes the selected data value from the first map as a command input for closed-loop control, and when the EGR system is inactive, processes the selected data value from the second map as a command input for closed-loop control.

5. A control system as set forth in claim 4 wherein the processor also processes data to develop a feed-forward control component for control of the valve, the first map set comprises a third map containing feed-forward data values each correlated both with a particular span of engine fueling within a range of engine fueling and with a particular span of engine speed within a range of engine speeds, the second map set comprises a fourth map containing data values each correlated both with a particular span of engine fueling within a range of engine fueling and with a particular span of engine speed within a range of engine speeds, and when the EGR system is active, the processor selects for further processing to develop the feed-forward control component a data value from the third map based on current engine speed and current engine fueling, and when the EGR system is inactive, the control system selects for further processing to develop the feed-forward control component a data value from the fourth map based on current engine speed and current engine fueling.

6. An internal combustion engine comprising:
an intake system including a turbocharger compressor for developing combustion charge air for the engine;
combustion chambers where charge air and fuel are combusted to operate the engine;
an exhaust system through which exhaust gas resulting from combustion pass from the combustion chambers, including a turbocharger turbine that uses exhaust gas to operate the turbocharger compressor;
an EGR system for recirculating some exhaust gas from the exhaust system to the intake system;
a valve for selectively shunting exhaust gas around a stage of the turbine; and
a control system for selectively rendering the EGR system active and inactive and for developing a value for a set-point of operation for the valve defining the extent to which the valve shunts exhaust gas around the turbine stage, wherein the control system comprises a first map set containing data that the control system uses to the exclusion of data in a second map set to develop the set-point value when the EGR system is active and the control system uses the data in the second map set to the exclusion of the data in the first map set to develop the set-point value when the EGR system is inactive.

7. An engine as set forth in claim 6 wherein the data in both maps sets are measured by a parameter comprising one of exhaust back-pressure, manifold absolute pressure, and manifold gauge pressure, and the control system comprises a closed-loop control that closes a control loop by feedback measured in the same parameter as the parameter in which the map data is measured.

8. An engine as set forth in claim 6 wherein the turbocharger comprises a high-pressure stage in upstream flow relation to a low-pressure stage, and the valve shunts the high-pressure stage.

9. An engine as set forth in claim 6 wherein the first map set comprises a first map containing data values each correlated both with a particular span of engine fueling within a range of engine fueling and with a particular span of engine speed within a range of engine speeds, the second map set comprises a second map containing data values each correlated both with a particular span of engine fueling within a range of engine fueling and with a particular span of engine speed within a range of engine speeds, and when the EGR system is active, the control system selects for further processing to develop the set-point value a data value from the first map based on current engine speed and current engine fueling, and when the EGR system is inactive, the control system selects for further processing to develop the set-point value a data value from the second map based on current engine speed and current engine fueling.

10. An engine as set forth in claim 9 wherein the control system comprises a closed-loop control portion that when the EGR system is active, processes the selected data value from the first map for closed-loop control of the valve, and that when the EGR system is inactive, processes the selected data value from the second map for closed-loop control of the valve.

11. An engine as set forth in claim 10 wherein the control system further comprises a feed-forward control portion coacting with the closed-loop control portion to control the valve, the first map set comprises a third map containing feed-forward data values each correlated both with a particular span of engine fueling within a range of engine fueling and with a particular span of engine speed within a range of engine speeds, the second map set comprises a fourth map containing data values each correlated both with a particular span of engine fueling within a range of engine fueling and with a particular span of engine speed within a range of engine speeds, and when the EGR system is active, the control system selects for further processing to develop a feed-forward component for control of the valve a data value from the third map based on current engine speed and current engine fueling, and when the EGR system is inactive, the control system selects for further processing to develop a feed-forward component for control of the valve a data value from the fourth map based on current engine speed and current engine fueling.

12. A method for control of a turbocharger in an internal combustion engine that has an intake system including a compressor of the turbocharger for developing combustion charge air for the engine, combustion chambers where charge air and fuel are combusted to operate the engine, an exhaust system through which exhaust gas resulting from combustion pass from the combustion chambers, including a turbine of the turbocharger operated by exhaust gas to operate the compressor, an EGR system for recirculating some exhaust gas from the exhaust system to the intake system, and a device for selectively utilizing exhaust gas to operate the turbine, the method comprising:

processing data to selectively render the EGR system active and inactive and to develop a value for a set-point of operation for the turbocharger defining the extent to which exhaust gas is utilized to operate the turbine;

processing data to select from a first map set containing set-point data based on the EGR system being active, a set-point data value correlated with current engine speed and engine load and further processing the selected set-point data value from the first map when the EGR system is active to develop the set-point of operation for the turbocharger; and processing data to select from a second map set containing set-point data based on the EGR system being inactive, a set-point data value correlated with current engine speed and engine load and further processing the selected set-point data value from the second map when the EGR system is inactive to develop the set-point of operation for the turbocharger.

13. A method as set forth in claim 12 further including using the value for set-point of operation for the turbocharger to set the extent to which a valve shunts exhaust gas flow around a stage of the turbine.

14. A method as set forth in claim 12 further comprising processing data to develop a closed-loop control component for the set-point of operation for the turbocharger, and when the EGR system is active, processing the selected set-point data value from a map of the first map set as a command input for closed-loop control, and when the EGR system is inactive, processing the selected set-point data value from a map of the second map set as a command input for closed-loop control.

15. A method as set forth in claim 14 further comprising processing data to develop a feed-forward control component for the set-point of operation for the turbocharger, and when the EGR system is active, processing a selected data value from a second map of the first map set to develop the feed-forward control component, and when the EGR system is inactive, processing s selected data value from a second map of the second map to develop the feed-forward control component.

* * * * *